(12) United States Patent
Toya

(10) Patent No.: US 7,770,708 B2
(45) Date of Patent: Aug. 10, 2010

(54) WET-TYPE MULTI-PLATE CLUTCH

(75) Inventor: Ritsuo Toya, Fukuroi (JP)

(73) Assignee: NSK-Warner K.K., Tokyo (JP)

( * ) Notice: Subject to any disclaimer, the term of this patent is extended or adjusted under 35 U.S.C. 154(b) by 555 days.

(21) Appl. No.: 11/790,803

(22) Filed: Apr. 27, 2007

(65) Prior Publication Data

US 2007/0251795 A1 Nov. 1, 2007

(30) Foreign Application Priority Data

Apr. 28, 2006 (JP) ............................. 2006-126438

(51) Int. Cl.
*F16D 69/00* (2006.01)
(52) U.S. Cl. ................. 192/70.14; 192/107 R; 29/458
(58) Field of Classification Search .................. None
See application file for complete search history.

(56) References Cited

U.S. PATENT DOCUMENTS 6,062,367 A 5/2000 Hirayanagi et al.
6,397,997 B2 * 6/2002 Kato ................... 192/70.14
6,702,088 B2 3/2004 Kitaori et al.
2004/0069586 A1 4/2004 Sasse
2004/0121145 A1 6/2004 Kawabata et al.
2007/0151822 A1 7/2007 Toya et al.
2007/0187206 A1 8/2007 Toya
2007/0246321 A1 10/2007 Toya

FOREIGN PATENT DOCUMENTS

JP 63-297832 A 12/1988
JP 11-141570 5/1999

* cited by examiner

*Primary Examiner*—Rodney H Bonck
*Assistant Examiner*—Ryan Dodd
(74) *Attorney, Agent, or Firm*—Miles & Stockbridge P.C.

(57) ABSTRACT

The present invention provides a wet-type multi-plate clutch comprising an external toothed plate formed by sticking a friction material onto a core plate and an internal toothed plate formed by a friction material onto a core plate and designed so that torque is transmitted by engaging the external toothed plate with the internal toothed plate and wherein each of the external toothed plate and the internal toothed plate has one axial surface including a convex surface to which a friction material is stuck, and a friction surface from which a surface of the core plate is exposed and wherein the convex surface and the friction surface are opposed to each other.

25 Claims, 2 Drawing Sheets

WET-TYPE MULTI-PLATE CLUTCH

BACKGROUND OF THE INVENTION

1. Field of the Invention

The present invention relates to a wet-type multi-plate clutch used in a clutch and/or a brake of an automatic transmission (AT) of a vehicle and a method for manufacturing a plate used in such a wet-type multi-plate clutch.

2. Description of the Related Art

Conventional wet-type multi-plate clutches used in automatic transmissions generally comprise separator plates as external toothed plates and friction plates as internal toothed plates constructed by sticking friction materials onto core plates, and are designed to transmit torque by engaging the external toothed plates with the internal toothed plates.

In the past, as shown in FIG. 1 of Japanese Patent Application Laid-open No. 11-141570 (1999), a wet-type multi-plate clutch constituted by sticking friction materials onto both surfaces of friction plates as internal toothed plates is known. Further, a clutch design of one-surface alternate sticking type in which friction materials are stuck onto surfaces of the internal toothed plates and the external toothed plated which are not oppose to each other is also known.

However, in recent years, in order to reduce fuel consumption of a vehicle, it has been requested that the vehicle be made more compact and lighter, and an automatic transmission be made more compact and lighter to reserve the interior space of the vehicle, and also, an axial dimension of a wet-type multi-plate clutch used in the automatic transmission be made smaller.

In the conventional clutches, it is contemplated that a plate thickness of the core plate is decreased in order to reduce an axial dimension of a clutch pack; however, if the plate thickness of the core plate is decreased, heat resistance is reduced due to reduction of a heat absorbing ability of the metal surface of the external toothed plate associated with the friction material, and, since the plate thickness is small, a face pressure of the engagement surfaces between the internal toothed plate and the hub is increased and a face pressure of the engagement surfaces between the external toothed plate and the clutch drum is increased, with the result that inconvenience such as indentation is generated at the engagement surfaces. Thus, the reduction of the plate thickness causes a problem.

In the conventional plates, due to thermal insulation of the friction materials, most of friction heat generated upon engagement of the clutch was dispersed through the external toothed plates to which the friction materials are not stuck.

In the conventional clutches, it is contemplated that, in order to enhance the heat resistance, a plate thickness of the external toothed plate is increased to increase a heat dispersing amount; however, if the plate thickness is increased, there arises a problem that an axial length of the clutch is increased. To cope with this, a wet-type multi-plate clutch of one-surface alternate sticking type in which friction materials are stuck alternately onto one surface of the external toothed plate and one surface of the internal toothed plate so that friction heat is dispersed from both of the external toothed plate and the internal toothed plate has been proposed.

However, in such clutches of one-surface alternate sticking type, since the friction heat is generated at only one surface of each plate, unbalance of heat is generated between both surfaces of the plate, which may cause deformation of the plate, with the result that a bad influence is affected upon endurance and/or a friction property of the friction material. Further, during an idle rotation, since axial load balances between the front and rear surfaces differ from each other, a clearance between the internal toothed plate and the external toothed plate cannot be maintained to a fixed value, thereby increasing idle rotation drug.

SUMMARY OF THE INVENTION

Accordingly, an object of the present invention is to provide a wet-type multi-plate clutch in which, by sticking friction materials are stuck onto both surfaces of an external toothed plate and an internal toothed plate, friction heat is absorbed at both surfaces of the plates, thereby reducing unbalance of the plate heat, and, during an idle rotation, idle rotation drug can be reduced by separating the external toothed plate and the internal toothed plate from each other.

To achieve the above object, the present invention provides a wet-type multi-late clutch comprising an external toothed plate and an internal toothed plate which are formed by sticking friction materials onto core plates and designed so that torque is transmitted by engaging the external toothed plate with the internal toothed plate and wherein each of the external toothed plate and the internal toothed plate is provided at its axial one surface with a convex surface to which a friction material is stuck and a concave surface from which a surface of the core plate is exposed and wherein the convex surface and the concave surface are opposed to each other.

According to the wet-type multi-plate clutch of the present invention as mentioned above, the following advantages can be obtained.

By sticking the friction materials onto both surfaces of the external toothed plate and the internal toothed plate, friction heat is absorbed by both surfaces thereby to reduce unbalance of plate heat, and, during an idle rotation, idle rotation drug can be reduced by separating the external toothed plate from the internal toothed plate.

Further, since the surface to which the friction material is stuck is the convex surface, an adhesive for sticking the friction material onto the core plate can easily be coated on the convex surface by a rolling coater and the like, and, since the friction surface i.e. metal surface of the plate opposed to the friction material can be prevented from being coated by the adhesive, any masking for preventing the adhesive from being coated on the friction surface i.e. metal surface is not required and the manufacture of the plate can be facilitated.

Further, since the metal friction surface of the core plate is formed as the concave surface against which the convex surface of the corresponding plate, when it is assumed that a height of the convex portion and a depth of the concave portion are h, an axial dimension can be reduced by h between the opposed surfaces. (That is to say, in a condition that the same clearance is maintained between the friction material and the corresponding metal surface of the plate as that in the conventional multi-plate clutch, the dimension can be reduced by h.)

The term "internal toothed plate" used in this specification means a plate provided at its inner periphery with spline teeth and mounted on an inner hub of the wet-type multi-plate clutch for an axial movement and the term "external toothed plate means a plate provided at its outer periphery with spline teeth and mounted within an outer clutch case of the wet-type multi-plate clutch for an axial movement. Functions of the internal toothed plate and the external toothed plate are not necessarily the same as those of "separator plate" and "friction plate" which have been used generally and may differ from the latter in some points.

Further features of the present invention will become apparent from the following description of exemplary embodiments with reference to the attached drawings.

DESCRIPTION OF THE EMBODIMENTS

Figure 1:
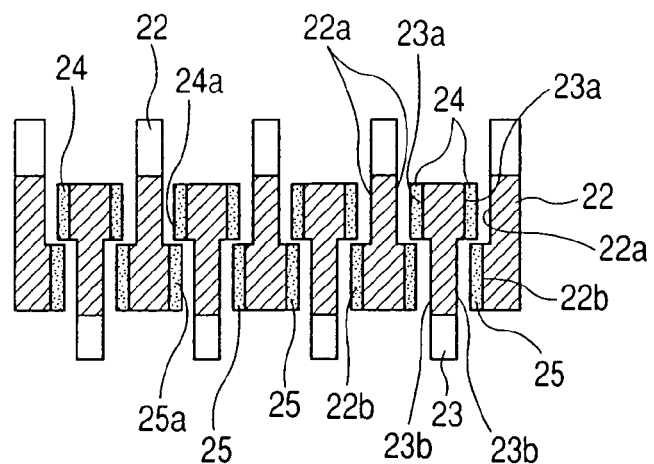
FIG. 1 is a sectional view showing details of external toothed plates and internal toothed plates according to a first embodiment of the present invention.

Now, various embodiments of the present invention will be fully explained with reference to the accompanying drawings. Incidentally, in the drawings, the same elements are designated by the same reference numerals.

Figure 5:
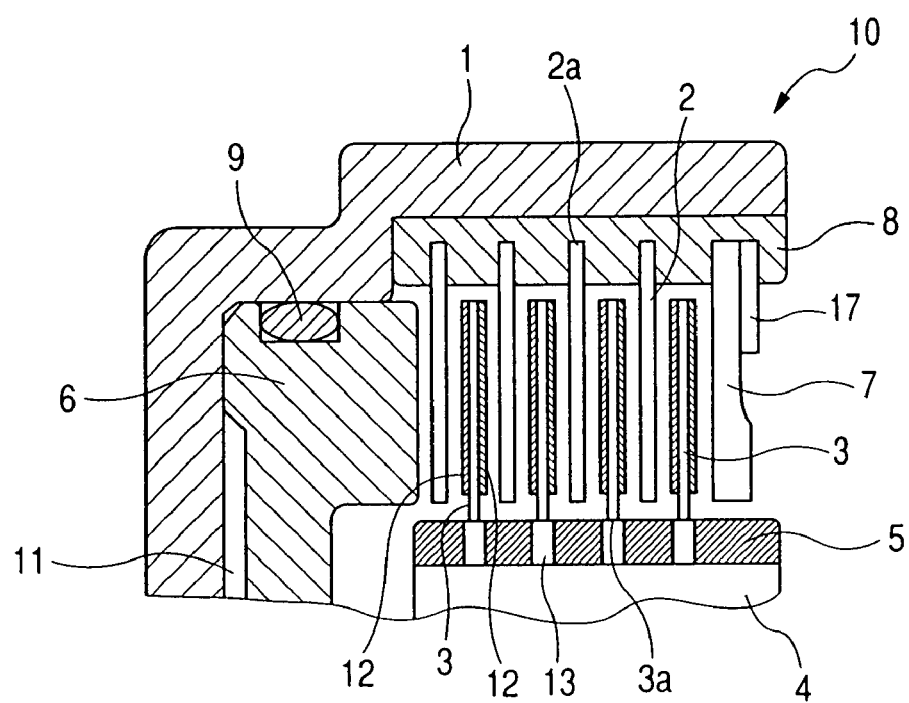
FIG. 5 is an axial partial sectional view for explaining a fundamental construction of a wet-type multi-plate clutch applicable to various embodiments of the present invention.

FIG. 5 is an axial partial sectional view for explaining a fundamental construction of a wet-type multi-plate clutch applicable to various embodiments of the present invention. Incidentally, here, an external toothed plate 2 and an internal toothed plate 3 each has a conventional construction.

A wet-type multi-plate clutch 10 comprises a substantially cylindrical drum or clutch case 1 having one axial open end, a hub 4 mounted within the clutch case 1 in coaxial with the clutch case for a relative rotation, annular external toothed plates 2 mounted to a spline member 8 provided on an inner periphery with the clutch case 1 for an axial movement, and annular internal toothed plates 3 arranged alternately with the external toothed plates 2 in an axial direction and mounted to a spline member 5 provided on an outer periphery of the hub 4 and onto which friction materials are stuck. Plural external toothed plates 2 and plural internal toothed plates 3 are provided.

The wet-type multi-plate clutch 10 further comprises a piston 6 for urging the external toothed plates 2 and the internal toothed plates 3 to engage these plates with each other, a backing plate 7 provided on the inner periphery of the clutch case 1 to fixedly hold the external toothed plates 2 and the internal toothed plates 2 at an axial one end, and a stop ring 17 for holding the backing plate.

As shown in FIG. 5, the piston 6 is disposed within a closed end portion of the clutch case 1 for an axial sliding movement. An O-ring 9 is disposed between an outer peripheral surface of the piston 6 and the inner surface of the clutch case 1. Further, a seal member (not shown) is also disposed between an inner peripheral surface of the piston 6 and an outer peripheral surface of a cylindrical portion (not shown) of the clutch case 1. Accordingly, an oil-tight hydraulic chamber 11 is defined between an inner surface of the closed end portion of the clutch case 1 and the piston 6.

Friction materials 12 having predetermined coefficient of friction are fixedly attached to both surfaces of each of the internal toothed plates 3. Further, the external toothed plates 2 have metallic friction surfaces and do not have any friction materials. Further, lubricating oil supply ports 13 are provided in the hub 4 to extend through the hub in a radial direction so that lubricating oil can be supplied to the wet-type multi-plate clutch 10 from the inner diameter side to the outer diameter side.

In the wet-type multi-plate clutch 10 having the above-mentioned arrangement, the clutch is engaged (tightened) and disengaged (released) in the following manner. A condition of FIG. 5 is a clutch released condition in which the external toothed plates and the internal toothed plates 3 are separated from each other. In the released condition, the piston 6 abuts against the inner surface of the closed end portion of the clutch case 1 by a biasing force of a return spring (not shown).

From this condition, in order to engage or tighten the clutch, hydraulic pressure is applied to the hydraulic chamber 11 defined between the piston 6 and the clutch case 1. As the hydraulic pressure is increased, the piston 6 is shifted to the right (FIG. 6) in the axial direction in opposition to the biasing force of the return spring (not shown), thereby closely contacting the external toothed plates 2 with the internal toothed plates 3. In this way, the clutch is tightened or engaged.

After the engagement, in order to release the clutch again, the hydraulic pressure in the hydraulic chamber 11 is released. When the hydraulic pressure is released, the piston 6 is shifted by the biasing force of the return spring (not shown) until it abuts against the inner surface of the closed end portion of the clutch case 1. In this way, the clutch is released or disengaged.

First Embodiment

FIG. 1 is a sectional view showing details of external toothed plates 22 and internal toothed plates 23 of a wet-type multi-plate clutch according to a first embodiment of the present invention. Both of the external toothed plates 22 and the internal toothed plates 23 are formed from metallic material such as steel, alloy or the like. A plurality of external toothed plates 22 disposed at a predetermined interval along an axial direction each is provided at its outer diameter side with friction surfaces 22a formed as concave or recessed surfaces from which metal is exposed and is also provided at its inner diameter side with convex or protruded surfaces 22b to which friction materials 25 are stuck by an adhesive and the like and which are protruded in the axial direction. In various embodiments shown in FIGS. 1 to 4, the clutch released condition is shown. That is to say, in this condition, the internal toothed plates 23 are not engaged with the external toothed plates 22.

Further, a plurality of internal toothed plates 23 disposed at a predetermined interval along an axial direction each is provided at its outer diameter side with convex surfaces 23a to which friction materials 24 are stuck by an adhesive and the like and which are protruded in the axial direction and is also provided at its inner diameter side with friction surfaces 23b formed as concave surfaces from which metal is exposed. As shown, the external toothed plates 22 and the internal toothed plates 23 have substantially the same axial thicknesses and are alternately arranged along the axial direction.

As can be seen from FIG. 1, in each of axially-outermost plates among the plural external toothed plates 22, the friction material 25 is stuck only onto the surface opposed to the corresponding internal toothed plate 23. Further, regarding the other external toothed plates (intermediate external toothed plates), the friction materials 25 are stuck onto both axial surfaces of each plate. The reason is that both surfaces of the intermediate external toothed plates are opposed to the associated internal toothed plates 23.

To the contrary, the friction materials 24 are stack onto both axial surfaces of all internal toothed plates 23. Thus, the friction materials 24 are stack onto all of the surfaces opposed to the external toothed plates 22 including the axially-outermost external toothed plates 22.

Inner diameter side edge portions 24a of the friction materials 24 provided on the internal toothed plates 23 are positioned not to interfere with outer diameter side edge portions 25a of the friction materials 25. That is to say, a predetermined radial clearance or gap is provided between the edge portion 24a and the edge portion 25a. Accordingly, the clutch can be tightened without any interference between the friction materials 24 and the friction materials 25.

Axial thicknesses of the friction material 24 and the friction material 25 are substantially the same and heights of the convex surfaces 22b and 23a to which the friction material 24 and the friction material 25 are stack, respectively, are also substantially the same. Accordingly, upon the engagement of the clutch, the friction materials 24 of the internal toothed plates 23 can abut against the opposed friction surfaces 22a of the external toothed plates 22 and the friction materials 25 of the external toothed plates 22 can abut against the opposed friction surfaces 23b of the internal toothed plates 23 without excess and deficiency, respectively.

By designing so that The internal toothed plates 23 and the external toothed plates 22 are provided with the convex surfaces to which the friction materials are stuck and that the corresponding friction surfaces are opposed to the respective convex surfaces, i.e., by designing so that, even if the friction material is deformed or worn by an amount greater than the height of the convex surface, the opposed friction surfaces do not interfere with each other, it is possible to reduce the axial length by an amount corresponding to the height of the convex surface offset in the axial direction, between the opposed surfaces of the external toothed plate 22 and the internal toothed plate 23. That is to say, when it is assumed that the number of sets of the opposed friction surfaces is N and the height of the concave surface is h, in the entire wet-type multi-plate clutch, the axial length can be reduced by N×h in total. This is also true in various embodiments which will be described later.

Second Embodiment

Figure 2:
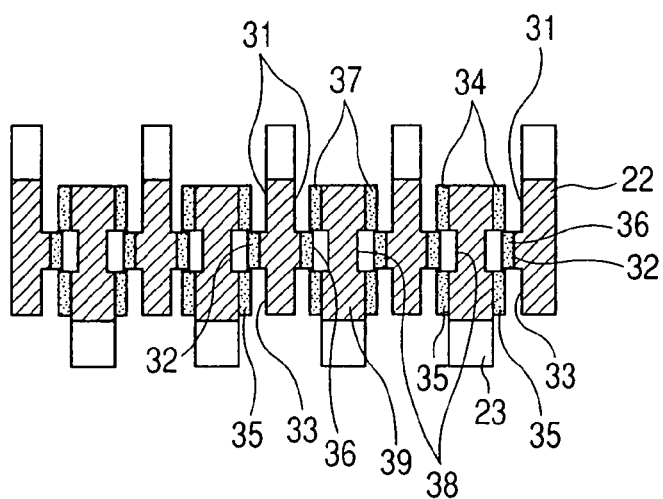
FIG. 2 is a sectional view showing details of external toothed plates and internal toothed plates according to a second embodiment of the present invention.

FIG. 2 is a sectional view showing details of external toothed plates 22 and internal toothed plates 23 of a wet-type multi-plate clutch according to a second embodiment of the present invention. A fundamental construction of the second embodiment is the same as that of the first embodiment.

In the second embodiment, the external toothed plates 22 are provided at their radial intermediate regions with convex surfaces 32 to which friction materials 36 are stack. In each of axially-outermost external toothed plates 22, the convex surface 32 is provided on the surface opposed to the corresponding internal toothed plate 23. However, regarding the other external toothed plates 22, the convex surfaces 32 are provided on both axial surfaces of each plate.

A region disposed at the outer diameter side from each convex surface 32 of the external toothed plate 22 defines a friction surface 31 from which the metal is exposed, and a region disposed at the inner diameter side from each convex surface of the external toothed plate defines a friction surface 33 from which the metal is exposed. The friction surfaces 31 and 33 are flush with each other; however, the convex surfaces 32 are protruded outwardly from the friction surfaces 31 and 33 in the axial direction. Similar to the convex surfaces 32, the friction surfaces 31 and 33 are provided on one axial surface of each of the axially-outermost external toothed plates 22 and are provided on both axial surfaces of the other external toothed plates 22.

On the other hand, the internal toothed plates 23 are provided at their radial intermediate regions with friction surfaces 38 from which the metal is exposed. A convex portion 37 and a convex portion 39 are provided in adjacent to each friction surface 38 at the outer and inner diameter sides of the friction surface 38, respectively. A friction material 34 is stuck to the convex surface 37 and a friction material 35 is stuck to the convex surface 39. The convex surfaces 37 and 39 and the friction surfaces 38 are provided on both axial surfaces of each internal toothed plate 23.

As shown in FIG. 2, the friction materials 36 stuck to the convex surfaces 32 of the external toothed plates 22 are opposed to the friction surfaces 38 of the internal toothed plates 23, and the friction surfaces 31 and 33 are opposed to the friction material 34 stuck to the convex surface 37 of the internal toothed plate 23 and the friction material 35 stuck to the convex surface 39, respectively.

Similar to the first embodiment, the convex surfaces 37 provided on the internal toothed plates 23 and inner diameter side edge portions of the friction materials 34 attached to such convex portions 37 and the convex surfaces 39 and outer diameter side edge portions of the friction materials 35 attached to such convex portions 39 are arranged to have predetermined clearances with respect to (not to interfere with) the concave portions 32 of the external toothed plates and inner and outer diameter side edge portions of the friction materials 36 attached to such concave portions. Accordingly, the external toothed plates 22 can be engaged with the internal toothed plates 23 without any interference between the friction materials 34, 35 and 36. In this way, the clutch can be tightened.

Third Embodiment

Figure 3:
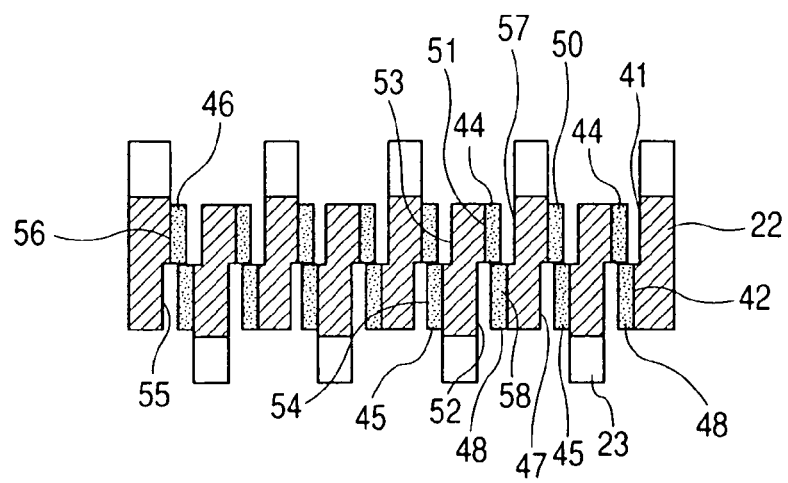
FIG. 3 is a sectional view showing details of external toothed plates and internal toothed plates according to a third embodiment of the present invention.

FIG. 3 is a sectional view showing details of external toothed plates 22 and internal toothed plates 23 of a wet-type multi-plate clutch according to a third embodiment of the present invention.

In the third embodiment, except for axially-outermost external toothed plates 22, both of external toothed plates 22 and internal toothed plates 23 are provided at their axial both surfaces with friction surfaces and convex surfaces. Each of the axially-outermost external toothed plates 22 is provided with a friction surface and a convex surface on a side opposed to the associated internal toothed plate 23. That is to say, in one of the axially-outermost external toothed plates 22, a convex surface 42 to which a friction material 48 is stuck is formed at an inner diameter side and a friction surface 41 is formed at an outer diameter side. On the other hand, in the other axially-outermost external toothed plate, a convex surface 56 to which a friction material 46 is stuck is formed at an outer diameter side and a friction surface 55 is formed at an inner diameter side.

All of the other (intermediate) external toothed plates 22 have the same configurations. And, each intermediate external toothed plate has an axial one surface including an outer diameter side surface 50 to which a friction material 46 is stuck and an inner diameter side concave surface defining a friction surface 47, and the other axial surface including outer diameter side friction surface 57 and an inner diameter side convex surface 58 to which a friction material 48 is stuck.

Each of the internal toothed plate 23 has an axial one surface including an outer diameter side convex surface 50 to which a friction material 44 is stuck and an inner diameter side friction surface 47, and the other axial surface including an outer diameter side friction surface 53 and an inner diameter side convex surface 54 to which a friction material 45 is stuck.

When the clutch is tightened by engaging the external toothed plates 22 with the internal toothed plates 23 having the above-mentioned construction in the axial direction, the axially opposed friction surface 41 and friction material 44, the axially opposed friction surfaces 57 and friction materials 44, the axially opposed friction surface 53 and friction material 46, the axially opposed friction surfaces 52 and friction materials 48 and the axially opposed friction surfaces 47 and friction materials 45 are engaged with each other. Further, the opposed friction surfaces and convex surfaces provided on the external toothed plates 22 and internal toothed plates 23 are offset from each other in the radial direction so that edge portions of these surfaces do not interfere with each other. Accordingly, the engagement of the clutch is not obstructed.

Fourth Embodiment

Figure 4:
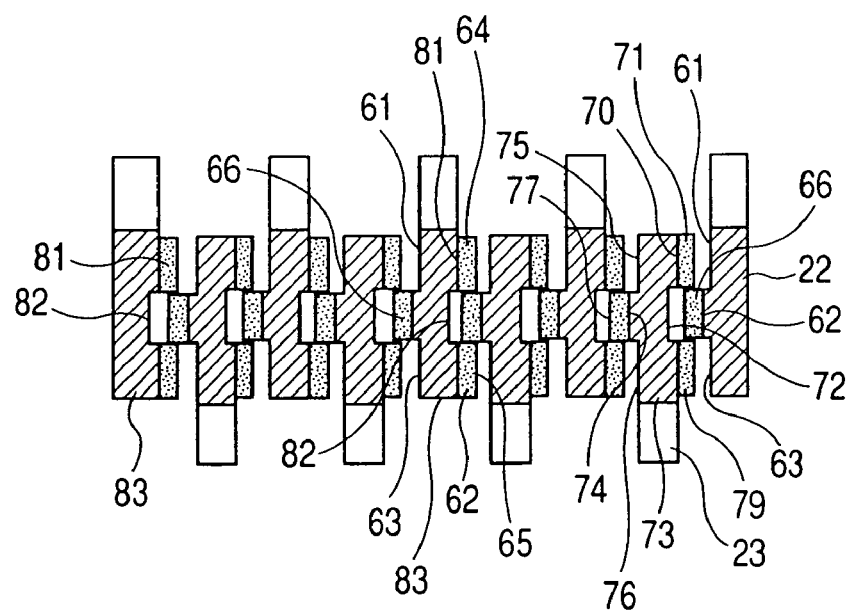
FIG. 4 is a sectional view showing details of external toothed plates and internal toothed plates according to a fourth embodiment of the present invention.

FIG. 4 is a sectional view showing details of external toothed plates 22 and internal toothed plates 23 of a wet-type multi-plate clutch according to a fourth embodiment of the present invention.

The fourth embodiment is an alteration of second embodiment. Each external toothed plate 22 is provided at its intermediate region with a convex surface 62 to which a friction material 66 is stuck. In one of axially-outermost external toothed plates 22, a convex surface 62 is formed on only a surface opposed to the internal toothed plate 23. Further, in the other axially-outermost external toothed plates 22, an outer diameter side convex surface 81, an inner diameter side convex surface 83 and an intermediate friction surface 82 as a concave surface are formed on only a surface opposed to the internal toothed plate 23.

All of the other (intermediate) external toothed plates 22 have the same configurations. And, each intermediate external toothed plate has an axial one surface including an outer diameter side convex surface 81 to which a friction material 64 is stuck, an inner diameter side convex surface 83 to which a friction material 65 is stuck, and an intermediate friction surface 82 as a concave surface. Further, the external toothed plate has the other axial surface including a radially intermediate convex surface 62 which is opposed to the friction surface 82 and to which a friction material 66 is stuck, an outer diameter side friction surface 61 and an inner diameter side friction surface 63. This arrangement is the same as that of the rightmost (FIG. 6) external toothed plate 22.

The internal toothed plates 23 have the same configurations. And, each internal toothed plate has an axial one surface including an outer diameter side convex surface 70 to which a friction material 71 is stuck, an inner diameter side convex surface 73 to which a friction material 79 is stuck, and an intermediate friction surface 72 as a concave surface. Further, the internal toothed plate has a radially intermediate convex surface 74 which is opposed to the friction surface 72 and to which a friction material 77 is stuck, an outer diameter side friction surface 75 and an inner diameter side friction surface 76.

When the clutch is tightened by engaging the external toothed plates 22 with the internal toothed plates 23 having the above-mentioned construction in the axial direction, the axially opposed friction surfaces 61 and friction materials 71, the axially opposed friction surfaces 63 and friction materials 79, the axially opposed friction surfaces 75 and friction materials 64, the axially opposed friction surfaces 76 and friction materials 65, the axially opposed friction surfaces 72 and friction materials 66 and the axially opposed friction surface 82 and friction material 77 are engaged with each other. Further, the opposed friction surfaces and convex surfaces provided on the external toothed plates 22 and internal toothed plates 23 are offset from each other in the radial direction so that edge portions of these surfaces do not interfere with each other. Accordingly, the engagement of the clutch is not obstructed.

In the above-mentioned various embodiments, since tooth face pressures of the internal toothed plates and the external toothed plates can be reserved and friction heat can be absorbed from both surfaces of internal toothed plates and the external toothed plates, heat resistance is not reduced and the tooth face pressures can be maintained properly, thereby preventing indentation.

Further, in the above-mentioned embodiments, while an example that heights of all of the convex surfaces provided on the external toothed plates 22 and the internal toothed plates 23 are the same and axial thicknesses of all of the friction materials stuck to such surfaces are also the same was explained, they are not necessarily to be the same. When the height of the convex surface is set to be smaller, the thickness of the friction material stuck to the convex surface may be set to be greater accordingly. To the contrary, when the height of the convex surface is set to be greater, the thickness of the friction material stuck to the convex surface may be set to be smaller accordingly.

The friction material may be formed by punching the material in the form of a ring or may be formed by arranging a plurality of friction material segment in a ring shape. Further, a lubricating oil passage or an oil groove as a lubricating oil reservoir may be formed in the friction material. When the friction material is formed from the friction material segments, it is expected that gaps between the friction material segments can act as oil grooves.

In the internal toothed plates and the external toothed plates, the friction materials stuck to the outer diameter side regions of the plates and the friction materials stuck to the inner diameter side regions are formed from the same material; however, the friction materials may be formed from different materials. Further, it should be noted that the number of the friction materials disposed at plural positions along the radial direction is not limited to the illustrated numbers, but, any number of friction materials may be used.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-126438 filed Apr. 28, 2006, which is hereby incorporated by reference herein in its entirety.

What is claimed is:

1. A wet-type multi-plate clutch comprising an external toothed plate formed by attaching a friction material onto a first core plate and an internal toothed plate formed by attaching a friction material onto a second core plate and designed so that torque is transmitted by engaging said external toothed plate with said internal toothed plate, wherein:

each of said external toothed plate and said internal toothed plate has an axial surface including a first surface portion with friction material thereon and a friction surface portion, which is recessed with respect to the first surface portion, a surface of the corresponding core plate being exposed in the friction surface portion;

and wherein:

the first surface portion of one of the external toothed plate and the internal toothed plate is opposed to the friction surface portion of the other of the external toothed plate and the internal toothed plate.

2. A wet-type multi-plate clutch according to claim 1, wherein, for one of said internal toothed plate and said external toothed plate, said friction material includes a plurality of friction material segments applied on the corresponding core plate along a radial direction.

3. A wet-type multi-plate clutch according to claim 1, wherein, for one of said internal toothed plate and said external toothed plate, said friction material on said axial surface is asymmetrically arranged with respect to friction material on an opposite axial surface of the corresponding core plate.

4. A wet-type multi-plate clutch according to claim 1, wherein thicknesses of the first and second core plates are selected so that heat absorbing capacities at said friction surface portions of said external toothed plate and said internal toothed plate become substantially the same.

5. A wet-type multi-plate clutch according to claim 1, wherein said friction material to be engaged at an outermost diameter side is attached to said internal toothed plate.

6. A wet-type multi-plate clutch according to claim 1, wherein a thickness of said second core plate of said internal toothed plate is greater than a thickness of said first core plate of said external toothed plate.

7. A wet-type multi-plate clutch according to claim 1, wherein a friction area of said friction material of said internal toothed plate is greater than a friction area of said friction material of said external toothed plate.

8. A wet-type multi-plate clutch according to claim 1, wherein a thickness of said first core plate of said external toothed plate is greater than a thickness of said second core plate of said internal toothed plate.

9. A method for manufacturing an external toothed plate and/or an internal toothed plate for a wet-type multi-plate clutch, the method comprising:

securing a friction material to a first surface portion of an axial surface of a core plate, wherein said axial surface has a friction surface portion recessed with respect to the first surface portion, and friction material is not secured to the friction surface portion such that a surface of the core plate is exposed in said friction surface portion.

10. A wet-type multi-plate clutch according to claim 1, wherein each of said external toothed plate and said internal toothed plate has a second axial surface opposite the first axial surface, the second axial surface has another first surface portion with friction material thereon and another friction surface portion, which is recessed with respect to the another first surface portion, a surface of the corresponding core plate is exposed in the another friction surface portion, the first surface portions of the corresponding core plate are opposite to each other, and the friction surface portions of the corresponding core plate are opposite to each other.

11. A wet-type multi-plate clutch comprising an external toothed plate formed by attaching a friction material onto a first core plate and an internal toothed plate formed by attaching a friction material onto a second core plate and designed so that torque is transmitted by engaging said external toothed plate with said internal toothed plate, wherein:

each of said external toothed plate and said internal toothed plate has respective first and second axial surfaces, each axial surface including a first surface portion with friction material thereon and a friction surface portion, which is recessed with respect to the first surface portion, a surface of the corresponding core plate being exposed in the friction surface portion;

and wherein:

for each of said external toothed plate and said internal toothed plate, the first surface portion of the first axial surface is on an opposite side of the corresponding core plate from the friction surface portion of the second axial surface, and the first surface portion of one of the external toothed plate and the internal toothed plate is opposed to the friction surface portion of the other of the external toothed plate and the internal toothed plate.

12. A wet-type multi-plate clutch according to claim 11, wherein, for one of said internal toothed plate and said external toothed plate, said friction material includes a plurality of friction material segments applied on the corresponding core plate along a radial direction.

13. A wet-type multi-plate clutch according to claim 11, wherein, for one of said internal toothed plate and said external toothed plate, said friction material on said first axial surface is asymmetrically arranged with respect to friction material on said second axial surface of the corresponding core plate.

14. A wet-type multi-plate clutch according to claim 11, wherein thicknesses of the first and second core plates are selected so that heat absorbing capacities at said friction surface portions of said external toothed plate and said internal toothed plate become substantially the same.

15. A wet-type multi-plate clutch according to claim 11, wherein said friction material to be engaged at an outermost diameter side is attached to said internal toothed plate.

16. A wet-type multi-plate clutch according to claim 11, wherein a thickness of said second core plate of said internal toothed plate is greater than a thickness of said first core plate of said external toothed plate.

17. A wet-type multi-plate clutch according to claim 11, wherein a friction area of said friction material of said internal toothed plate is greater than a friction area of said friction material of said external toothed plate.

18. A wet-type multi-plate clutch according to claim 11, wherein a thickness of said first core plate of said external toothed plate is greater than a thickness of said second core plate of said internal toothed plate.

19. A method for manufacturing an external toothed plate and/or an internal toothed plate for a wet-type multi-plate clutch, the method comprising:

securing friction material to respective first surface portions of first and second axial surfaces of a core plate, wherein each axial surface has a friction surface portion recessed with respect to the corresponding first surface portion, the first surface portion of one of the first and second axial surfaces is on an opposite side of the core plate from the friction surface portion of the other of the first and second axial surfaces, and friction material is not secured to the core plate in the friction surface portions such that surfaces of the core plate are exposed in said friction surface portions.

20. A wet-type multi-plate clutch comprising:

first and second friction plates, each friction plate having an axial surface including a first surface portion with a friction material thereon and an exposed friction surface portion, which is recessed with respect to said first surface portion, wherein the first and second friction plates are arranged such that the friction material on each of the first and second friction plates is opposed to the exposed friction surface portion of the other of the first and second friction plates for frictional engagement therewith.

21. A wet-type multi-plate clutch according to claim 20, wherein one of the first and second friction plates is an externally-toothed plate and the other of the first and second friction plates is an internally-toothed plate.

22. A wet-type multi-plate clutch according to claim 20, wherein the friction material on one of the first and second friction plates includes a plurality of friction material segments at different positions in a radial direction.

23. A wet-type multi-plate clutch according to claim 20, wherein the friction material on the axial surface of one of the first and second friction plates is asymmetrically arranged with respect to friction material on an opposite axial surface of said one of the first and second friction plates.

24. A wet-type multi-plate clutch according to claim 20, wherein axial thicknesses of the first and second friction plates differ such that a heat imbalance due to engagement of the friction materials with the corresponding exposed friction surface portions is suppressed.

25. A wet-type multi-plate clutch according to claim 20, wherein the friction material on each of the first and second friction plates is comprised of a plurality of friction material segments.

* * * * *